(12) United States Patent
Lewis et al.

(10) Patent No.: US 9,323,850 B1
(45) Date of Patent: Apr. 26, 2016

(54) POTENTIAL SOCIAL RECIPIENT RANKING FOR MAXIMAL VIRAL CONTENT DISTRIBUTION

(75) Inventors: Justin Lewis, Marina Del Rey, CA (US); Brian Hawkins, Torrance, CA (US)

(73) Assignee: GOOGLE INC., Mountain View, CA (US)

(*) Notice: Subject to any disclaimer, the term of this patent is extended or adjusted under 35 U.S.C. 154(b) by 129 days.

(21) Appl. No.: 13/483,930

(22) Filed: May 30, 2012

(51) Int. Cl.
*G06F 17/30* (2006.01)

(52) U.S. Cl.
CPC .... *G06F 17/30867* (2013.01); *G06F 17/30864* (2013.01)

(58) Field of Classification Search
CPC .............. G06F 17/3053; G06F 17/30867
USPC .......... 707/723, 999.003, 748; 709/203, 204, 709/219, 224
See application file for complete search history.

(56) References Cited

U.S. PATENT DOCUMENTS

| | | | |
|---|---|---|---|
| 8,332,512 B1* | 12/2012 | Wu et al. | 709/224 |
| 8,725,858 B1* | 5/2014 | Wu et al. | 709/223 |
| 8,856,141 B1* | 10/2014 | Dean et al. | 707/748 |
| 8,903,909 B1* | 12/2014 | Marra et al. | 709/204 |
| 2009/0228296 A1* | 9/2009 | Ismalon | 705/1 |
| 2009/0319359 A1* | 12/2009 | Soza et al. | 705/14.25 |
| 2010/0217720 A1* | 8/2010 | Jones et al. | 705/319 |
| 2011/0295626 A1* | 12/2011 | Chen et al. | 705/7.11 |
| 2011/0307397 A1* | 12/2011 | Benmbarek | 705/319 |
| 2012/0158630 A1* | 6/2012 | Zaman et al. | 706/21 |
| 2013/0117364 A1* | 5/2013 | Bania et al. | 709/204 |

OTHER PUBLICATIONS

Yang et al., Mining Social Networks for Targeted Advertising, 2006, IEEE, 1-10.*

* cited by examiner

*Primary Examiner* — Jean B Fleurantin
(74) *Attorney, Agent, or Firm* — Lowenstein Sandler LLP

(57) ABSTRACT

Methods and systems are disclosed for estimating a "viral score" for users in a social network, where the viral score estimates a potential contribution of a user to the virality of a content item (e.g., a webpage, a photo, a video clip, an audio clip, etc.) if the content item is shared with the user via the social network. In one embodiment, when a first user wishes to share a content item with one or more of his or her followers in the social network, a computer system determines a viral score for a second user who is a follower of the first user. The computer system then determines whether the second user is to be included in a list of potential recipients for the content item based on the second user's viral score, and presents the list to the first user.

15 Claims, 5 Drawing Sheets

POTENTIAL SOCIAL RECIPIENT RANKING FOR MAXIMAL VIRAL CONTENT DISTRIBUTION

TECHNICAL FIELD

Embodiments of the present invention relate to data processing, and more specifically, to ranking users of a social network.

BACKGROUND

A social network is a social structure made up of individuals (referred to as "nodes") who are connected to one another via one or more relationships, such as friendship, kinship, common interest, and so forth. A social networking service is an online service, platform, or site that enables users to participate in a social network and build connections with other users.

In some social networking services connections are directional; for example, a first user may be a "follower" of a second user, while the second user may or may not be a follower of the first user. In some other social networking services, connections are always bi-directional; for example, if a first user is a "friend" of a second user, then the second user is also a friend of the first user (i.e., both the first user and second user are "friends"). Users of a bi-directionally-connected social networking service can be thought of as being directionally connected; for example, if Alice and Bob are friends in a bi-directionally-connected social networking service, one could also say that Alice is a follower of Bob and Bob is a follower of Alice.

Social networking services are playing an increasing role in the distribution of content (e.g., web pages, pictures, video clips, etc.) among users. In particular, a user may share a particular content item with some or all of his connections, each of whom may in turn share the content item with some or all of their connections, and so forth. When a shared content item propagates rapidly and quickly reaches a large number of users, the content item may be said to have great "virality," or in popular usage, "to have gone viral."

SUMMARY

In an embodiment of the present invention, a computer system receives an indication that a first user of a social network wishes to share a content item (e.g., a webpage, a photo, a video clip, an audio clip, etc.) with one or more followers of the first user in the social network. In response, the computer system determines a "viral score" for a second user of the social network who is a follower of the first user, where the viral score estimates a potential contribution of the second user to the virality of the content item if the content item is shared with the second user via the social network. The computer system then determines whether the second user is to be included in a list of potential recipients for the content item based on the second user's viral score, and presents the list to the first user.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
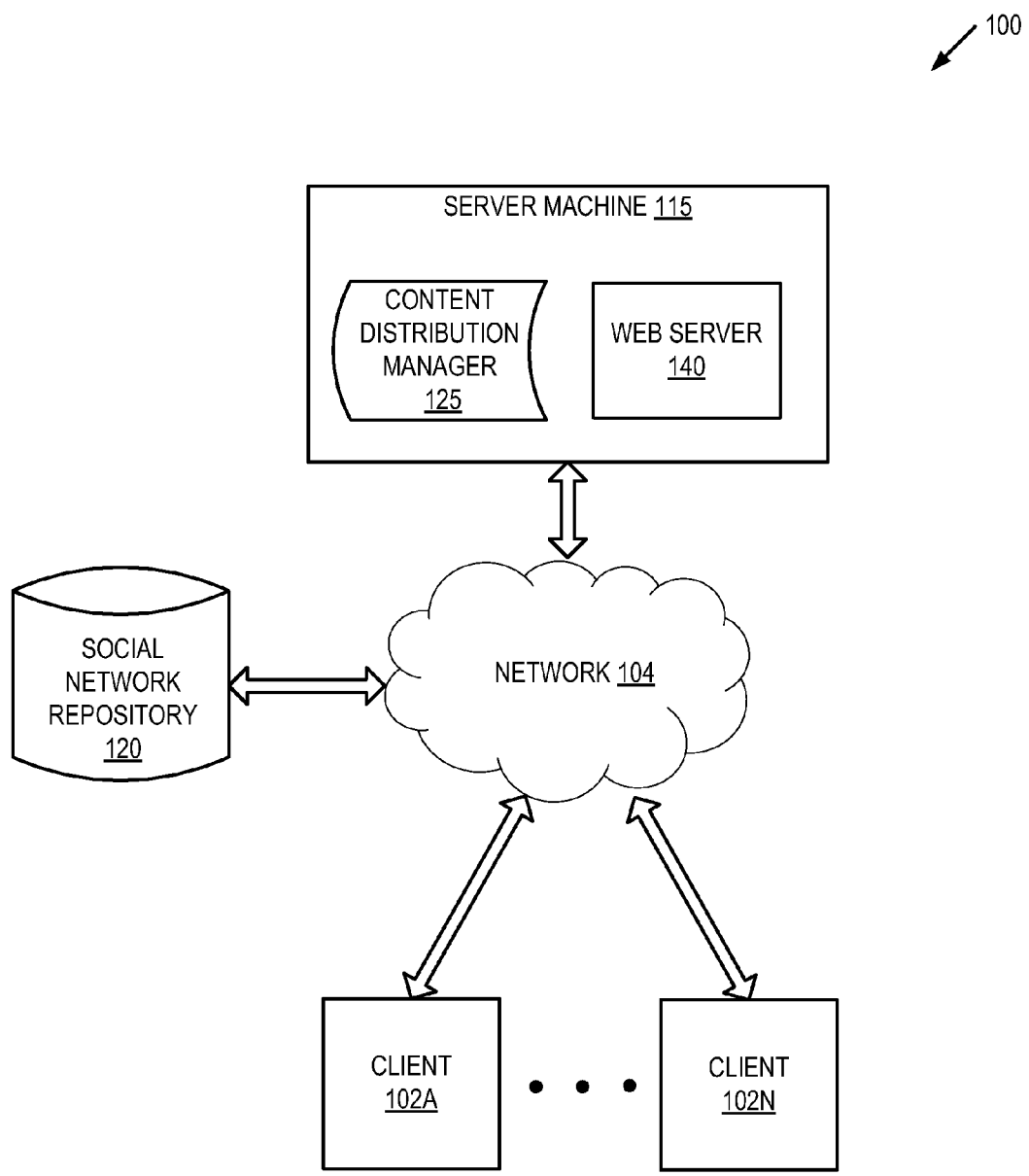
FIG. 1 illustrates an exemplary system architecture, in accordance with one embodiment of the present invention.

Methods and systems are described for managing how content items (e.g., web pages, photos, video clips, audio clips, etc.) are shared among users of a social network. Any user data that is collected with regards to the embodiments described herein would typically be anonymized, and users would have the option of opting-out of such data collection activities.

In accordance with one embodiment, when a first user of a social network wishes to share a content item with one or more of his or her followers, a computer system determines a "viral score" for each of his or her followers, where the viral score estimates a potential contribution of the follower to the virality of the content item if the content item is shared with the follower. The computer system then presents to the user an ordered list of followers as potential recipients for the content item, where the list is ordered by viral score.

For example, if John and Mary are two followers of a user, and John has a higher viral score than Mary, then John will appear earlier in the list than Mary—the rationale being that by sharing the content item with John, John is more likely to contribute to the virality of the content item (i.e., by sharing the content item with followers that, in turn, have high viral scores) than Mary. Intuitively, for example, if John has three hundred followers and Mary has ten followers, then, all other things being equal, one would expect John to have a higher viral score than Mary. As another example, if John and Mary both have the same number of followers, but John redistributes content received from a followee (i.e., someone he follows) to his own followers more often than Mary does, then, all other things being equal, one would again expect John to have a higher viral score than Mary. As yet another example, if John and Mary both have the same number of followers, but Mary's followers are primarily teenagers who spend a lot of time on the social network, while John's followers are primarily senior citizens who rarely spend time on the social network, then, all other things being equal, one would expect Mary to have a higher viral score than John.

In one embodiment, the viral score of a follower may also be based on the content item to be shared. For example, if the content item is a New York Times article about the New York Giants, then, all other things being equal, a follower who lives in New York may be assigned a higher viral score than a follower who lives in Chicago. Similarly, a follower who is a fan of the New York Giants, as indicated by the follower's profile in the social network (e.g., by the follower "Like"ing the New York Giants, etc.), may be assigned a higher viral score than another follower for whom there is no indication of liking the New York Giants, or of liking sports in general.

Embodiments of the present invention thus encourage content items to "go viral" via propagation through a social network. Moreover, by ordering a list of potential recipients in an intelligent fashion, embodiments of the present invention can make it more convenient for a user to identify followers with whom to share content, and thereby improve the user experience.

FIG. 1 illustrates an example system architecture 100, in accordance with one embodiment of the present invention. The system architecture 100 includes a server machine 115, a social network repository 120 and client machines 102A-102N connected to a network 104. Network 104 may be a public network (e.g., the Internet), a private network (e.g., a local area network (LAN) or wide area network (WAN)), or a combination thereof.

The client machines 102A-102N may be wireless terminals (e.g., smartphones, etc.), personal computers (PC), laptops, tablet computers, or any other computing or communication devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue image and/or video search queries to the web server or may browse images and/or videos that have previously been classified. The client machines 102A-102N may also upload images and/or video to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140 and a content distribution manager 125. In alternative embodiments, the web server 140 and content distribution manager 125 may run on different machines.

Social network repository 120 is a persistent storage that is capable of storing information concerning a social network, such as user profile information, links among users (e.g., undirected edges between users who are friends, directed edges between users and their followers, etc.), user actions (e.g., status updates, sharing a content item, "Like"ing another user's status update, etc.), content items uploaded by users (e.g., photos, video clips, audio clips, etc.), and so forth, as well as data structures to tag, organize, and index this information. In some embodiments, social network repository 120 might be a network-attached file server, while in other embodiments social network repository 120 might be some other type of network-based or local persistent storage in the form of an object-oriented database, a relational database, a collection of files, and so forth. Social network repository 120 may be hosted by the server machine 115 or one or more different machines coupled to the server machine 115 via the network 104. The photos, video clips, and audio clips stored in the social network repository 120 may include user-generated content that is uploaded by client machines 102. The photos, video clips, and audio clips may additionally or alternatively include content provided by service providers such as news organizations, publishers, libraries and so on.

Web server 140 may serve web pages and data from social network repository 120 to clients 102A-102N whose users are members of the social network. In addition, web server 140 may receive data from clients 102A-102N (e.g., status updates, profile changes, content, etc.) and store the data in social network repository 120.

In accordance with some embodiments, content distribution manager 125 is capable of monitoring the behavior of users in the social network, of determining one or more measures of how "valuable" users of the social network are, of determining a "viral score" for users of the social network, of receiving user requests to share content, and of presenting an ordered list of potential recipients for a shared content item, where the potential recipients are followers of the user and are ordered by their viral scores. An embodiment of content distribution manager 125 is described in detail below and with respect to FIGS. 3 through 5.

Figure 2:
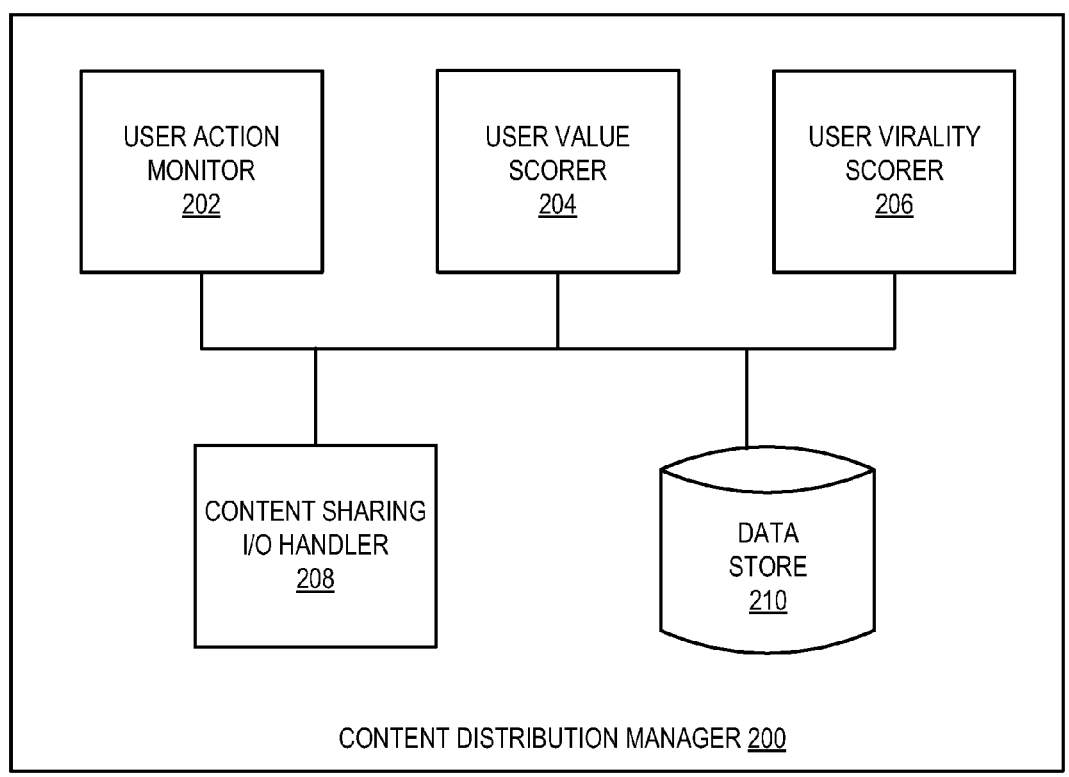
FIG. 2 is a block diagram of one embodiment of a content distribution manager.

FIG. 2 is a block diagram of one embodiment of a content distribution manager 200. The content distribution manager 200 may be the same as the content distribution manager 125 of FIG. 1 and may include a user action monitor 202, a user value scorer 204, a user virality scorer 206, a content sharing input/output handler 208, and a data store 210. The components can be combined together or separated in further components, according to a particular embodiment.

The data store 210 may include one or more temporary buffers and/or one or more permanent data stores to hold data pertaining to one or more users of the social network (e.g., user profile data, user actions, etc.), content (e.g., photos, audio clips, video clips, etc.), data structures for organizing and indexing data in social network repository 120, web pages that are served to users of the social network, scores associated with users of the social network (e.g., user value scores, user viral scores, etc.), ordered lists of users, or some combination of these data. Data store 210 may be hosted by one or more storage devices, such as main memory, magnetic or optical storage based disks, tapes or hard drives, NAS, SAN, and so forth. In one embodiment, the content distribution manager 200 notifies users of the types of information that are stored in the data store 210, and provides the users the opportunity to opt-out of having such information collected and/or shared with the content distribution manager 200.

The user action monitor 202 collects data concerning the actions of users in the social network, such as how much time users spend on the social network, how often users share and redistribute content, what kinds of content users share, how often users interact with content item shared with them (e.g., viewing a video clip shared with them, clicking on a link shared with them, etc.), how often users "Like" other users' status updates, and so forth.

The user value scorer 204 determines value scores for users of the social network based on the collected data. In one embodiment, user value scorer 204 determines two types of value scores:

(1) a content-dependent value score that reflects how valuable a particular user is with respect to a particular content item (e.g., how pertinent a content item is to a particular user, based on the user's profile information, content that the user has shared in the past, and so forth); and (2) an "inherent value" score that reflects how valuable a user is in general, based on criteria such as profile information (e.g., age, current city of residence, college degrees, number of followers, etc.), and user behavior, as observed by user action monitor 202 (e.g., how much time a user spends on the social network, how often a user shares and redistributes content, how often a user interacts with content shared with them, etc.).

The user virality scorer 206 determines viral scores for users of the social network using value scores of corresponding users. In one embodiment, the viral score for a user is based on one or more of the following factors:

the inherent value scores of the user's followers,
the content-dependent value scores of the user's followers,
the viral scores of the user's followers (computed recursively, based on the followers' followers), the estimated probability that a follower of the user notices a content item that the user shares with the follower, the estimated probability that a follower of the user notices a content item that any user shares with the follower, the estimated probability that a follower of the user interacts with a content item that the user shares with the follower, the estimated probability that a follower of the user interacts with a content item that any user shares with the follower, the estimated probability that a follower of the user interacts with a particular type of content item (e.g., a link, a photo, a video clip, an audio clip, etc.) that the user shares with the follower, the estimated probability that a follower of the user interacts with a particular type of content item that any user shares with the follower, the estimated probability that a follower of the user interacts with a particular topic of content item (e.g., politics, sports, humor, etc.) that the user shares with the follower, and the estimated probability that a follower of the user interacts with a particular topic of content item that any user shares with the follower.

The content sharing input/output handler 208 receives commands to share content from users of the social network, generates ordered lists of potential recipients of shared content, based on the viral scores of users' followers, and presents the ordered lists to users, along with one or more mechanisms to conveniently select followers from the lists (e.g., checkboxes in a graphical user interface [GUI], etc.).

Figure 3:
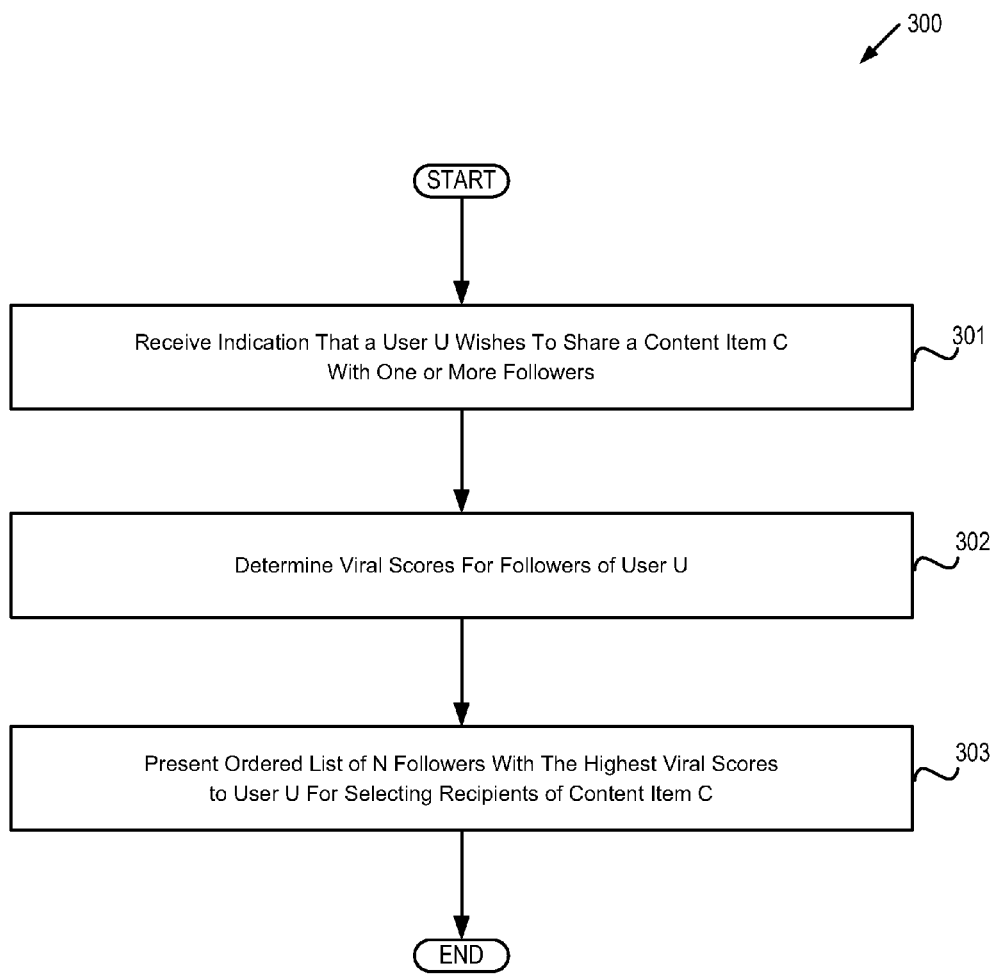
FIG. 3 depicts a flow diagram of one embodiment of a method for presenting an ordered list of potential recipients in a social network with whom to share a content item.
Figure 4:
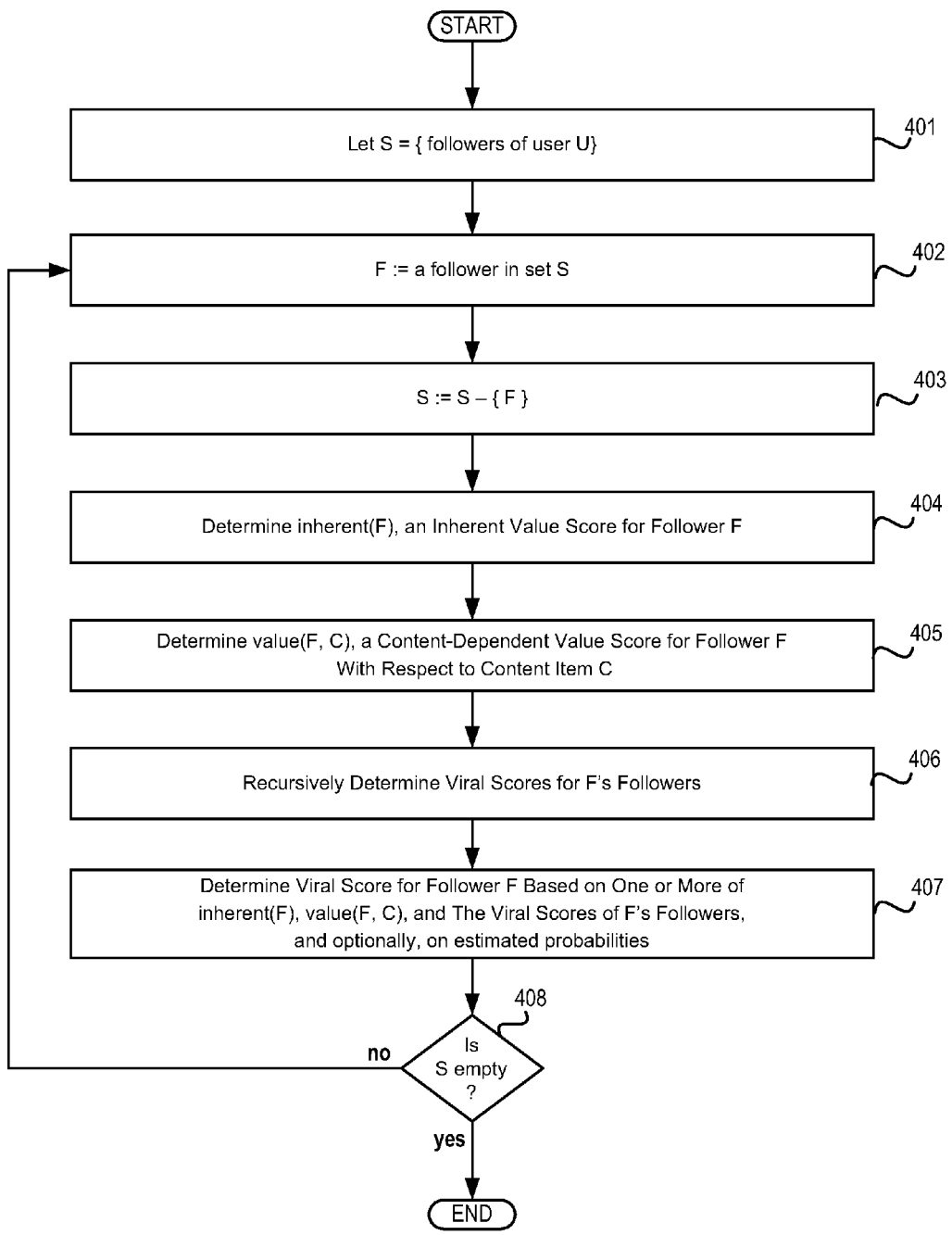
FIG. 4 depicts a flow diagram of one embodiment of a method for computing viral scores for followers of a user in a social network.

FIGS. 3 and 4 depict flow diagrams of some embodiments of methods for providing lists of potential recipients of a content item. The methods are performed by processing logic that may comprise hardware (circuitry, dedicated logic, etc.), software (such as is run on a general purpose computer system or a dedicated machine), or a combination of both. In one embodiment, the methods are performed by the server machine 115 of FIG. 1, while in some other embodiments, one or more operations of the method might be performed by another machine. It should be noted that in some embodiments, various components of content distribution manager 200 may run on separate machines.

FIG. 3 depicts a flow diagram of one embodiment of a method 300 for presenting an ordered list of potential recipients in a social network with whom to share a content item. At block 301, an indication that a particular user U wishes to share a particular content item C with one or more followers is received. It should be noted that in some embodiments, the indication received at block 301 may also specify a particular mechanism for sharing content item C (e.g., via email, via a private message in a messaging system provided by the social network, via a public entry in a follower's "stream" [sometimes referred to alternatively as a follower's "news feed"], etc.). In accordance with one embodiment, block 301 is performed by content sharing input/output handler 208.

At block 302, viral scores are determined for one or more followers of user U. An embodiment of a method for determining viral scores for user followers is described in more detail below and with respect to FIG. 4.

At block 303, user U is presented with a list of N followers with the highest viral scores, ordered by viral score (e.g., in descending order), for selecting recipients of content item C, where N is a positive integer that is no greater than the number of followers of user U. It should be noted that the rationale for potentially omitting some followers from the ordered list (i.e., when N is strictly less than the number of followers of user U) is that user U might have a very large number of followers, in which case it may be unwieldy, or may not make sense, to include all of the followers, particularly those having very low viral scores. In accordance with one embodiment, the ordered list is presented as a scroll-list in a graphical user interface (GUI) with checkboxes next to each follower, thereby enabling user U to conveniently select followers with whom to share content item C. In one such embodiment, block 303 is performed by content sharing input/output handler 208.

FIG. 4 depicts a flow diagram of one embodiment of a method for computing viral scores for followers of a user in a social network.

At block 401, a set S is initialized to contain the followers of user U. At block 402, a follower F is selected from set S. At block 403, follower F is removed from set S.

At block 404, an inherent value score for follower F, denoted inherent(F), is determined. As described above, inherent(F) is intended to estimate, quantitatively, how valuable follower F is, based on criteria such as profile information for follower F (e.g., age, current city of residence, college degrees, how many followers F has, etc.), follower F's behavior in the social network (e.g., how much time follower F spends on the social network, how often follower F redistributes content received from any followee, how often follower F redistributes content received from user U, how often follower F interacts with content shared with them by any followee, how often follower F interacts with content shared with them by user U, etc.), and so forth. It should be noted that the inherent value score may also be useful for other applications, such as advertising in the social network.

At block 405, a content-dependent value score for follower F, denoted value(F, C), is determined. As described above, value(F, C) is intended to estimate, quantitatively, how valuable follower F is with respect to content item C (e.g., how pertinent content item C is to follower F, based on the follower F's profile information, content that follower F has shared in the past, and so forth.)

At block 406, viral scores for F's followers are determined, by recursively executing the method of FIG. 4 for each follower. It should be noted that for reasons of practicality, this recursion needs to be cut off at some point, or otherwise, except in the smallest of social networks, it will be too time-intensive to determine viral scores for all users of the social network at block 406. Accordingly, in one embodiment, the recursion of block 406 is cut off at a depth of four, so that when fourth-generation followers are reached in the recursion, block 406 is skipped, in which case the determination of the viral score for a fourth-generation follower at block 407, described below, is not based on his or her followers' viral scores, but rather, based solely on his or her inherent value score and/or content-dependent value score.

At block 407, a viral score is determined for follower F based on one or more of: inherent(F), determined at block 404; value(F, C), determined at block 405; and the viral scores of F's followers, determined recursively at block 406; as well as, optionally, on one or more of the following:

the estimated probability that a follower of F notices a content item that F shares with the follower, the estimated probability that a follower of F notices a content item that any user shares with the follower, the estimated probability that a follower of F interacts with a content item that F shares with the follower, the estimated probability that a follower of F interacts with a content item that any user shares with the follower, the estimated probability that a follower of F interacts with a particular type of content item (e.g., a link, a photo, a video clip, an audio clip, etc.) that F shares with the follower, the estimated probability that a follower of F interacts with a particular type of content item that any user shares with the follower, the estimated probability that a follower of F interacts with a particular topic of content item (e.g., politics, sports, humor, etc.) that F shares with the follower, and the estimated probability that a follower of F interacts with a particular topic of content item that any user shares with the follower.

In one embodiment, the viral score for follower F, denoted viral(F), is computed according to the following equation:

$$\mathrm{viral}(F) = \mathrm{inherent}(F) + \mathrm{value}(F, C) + \sum_{G \in \mathit{followers}(F)} [p_{notice}(G, F) \cdot p_{interact}(G, F)] \cdot \mathrm{viral}(G) \quad \text{(Eq. 1)}$$

where $n_{notice}(G,F)$ denotes the estimated probability that G, a follower of F, notices content that F shares with G, and $p_{interact}(G,F)$ denotes the estimated probability that G interacts with content that F shares with G and that G notices.

In one such embodiment, $p_{notice}(G,F)$ may be based on the particular mechanism by which F intends to share content item C. For example, if F intends to share content item C via email, then $p_{notice}(G,F)$ might have a value close to or equal to 1, while if F intends to share content item C publicly, then $p_{notice}(G,F)$ might be computed as a function of one or more of the following:

how much time per day, on average, G spends on the social network, how many posts per day, on average, show up in G's stream (or "news feed"), the percentage of posts, on average, that G reads when visiting the social network, and the percentage of posts by F that G has read in the past.

It should be noted that in some embodiments one or more additional probabilities listed above may be incorporated into the formula of Equation 1, while in yet other embodiments some other type of function may be used, rather than the weighted summation of Equation 1.

Figure 5:
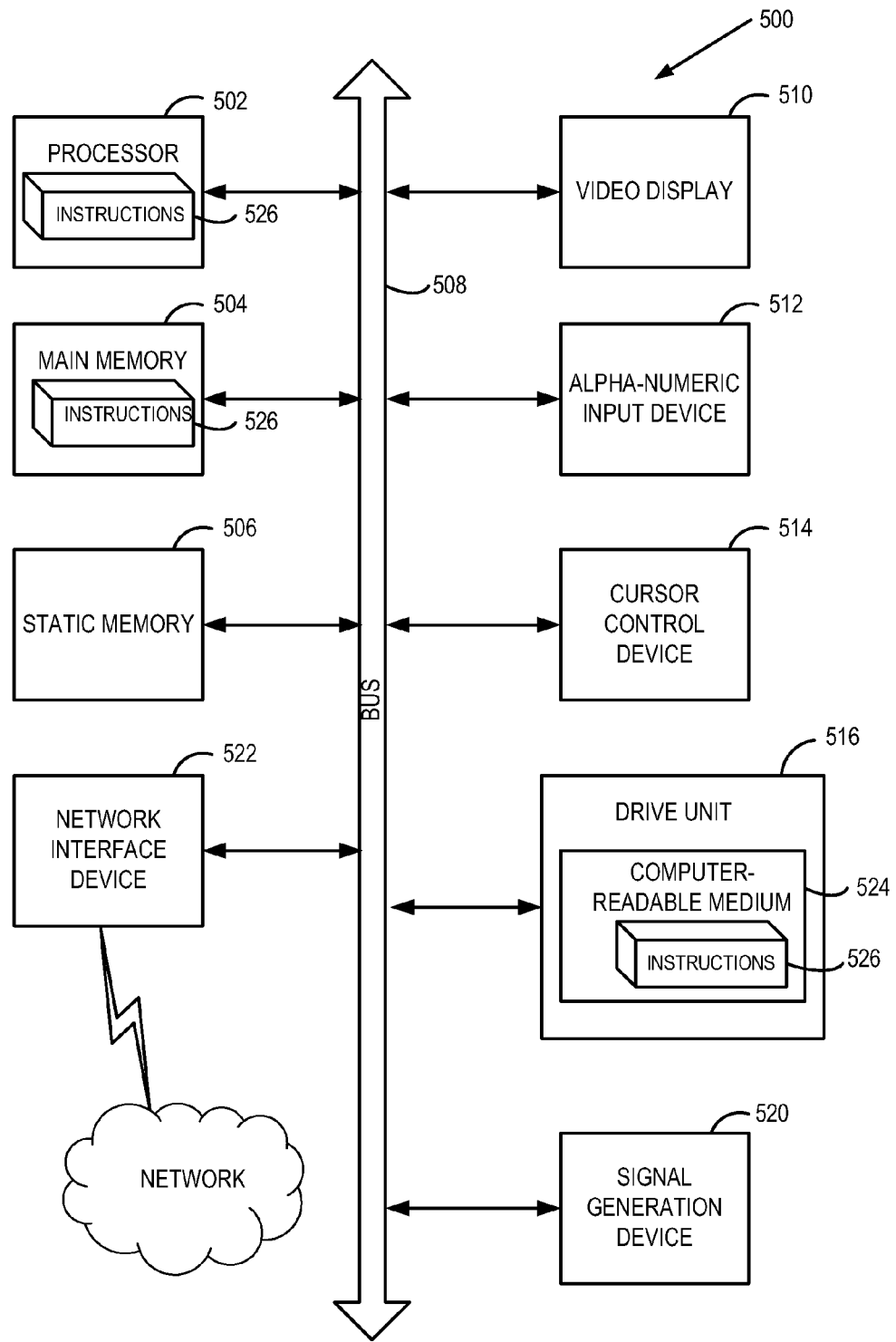
FIG. 5 depicts a block diagram of an illustrative computer system operating in accordance with embodiments of the invention.

FIG. 5 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions executed by content distribution manager 125 and corresponding to blocks 301 through 303 and 401 through 408, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "transmitting," "determining," "computing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, video clips (e.g., images, audio clips, textual documents, web pages, etc.). The scope of the invention should, therefore, be determined with reference to the appended claims, along with the full scope of equivalents to which such claims are entitled.

What is claimed is:

1. A method comprising:
    receiving, by a processing device of a computer system, an indication that a first user of a social network wishes to share a content item with one or more followers of the first user in the social network;
    determining by the processing device, for a second user of the social network who is one of the followers of the first user, a viral score that is based on a probability that content that is publicly shared with the second user appears in the second user's stream;
    generating, by the processing device, a list of potential recipients for the content item, wherein the list comprises a subset of the followers of the first user in the social network with the highest viral scores;
    presenting to the first user, in response to the indication, the list of potential recipients for the content item in descending order of viral scores;
    receiving, from the first user, a selection of one or more of the potential recipients; and
    sharing the content item with the selected one or more potential recipients.

2. The method of claim 1 wherein the viral score is further based on how frequently the second user redistributes content shared with the second user by any other user of the social network.

3. The method of claim 1 wherein the viral score is further based on a probability that the second user will notice content that appears in the second user's stream.

4. The method of claim 1 wherein the viral score is further based on the number of followers of the second user in the social network.

5. The method of claim 1 wherein the viral score is further based on a viral score for a follower of the second user in the social network.

6. An apparatus comprising:
    a network interface device; and
    a processing device, operatively coupled to the network interface device, to:
    receive, via the network interface device, an indication that a first user of a social network wishes to share a content item with one or more followers of the first user in the social network;
    determine, for a second user of the social network who is a follower of the first user, a viral score that is based on a probability that content that is publicly shared with the second user appears in the second user's stream;
    generate a list of potential recipients for the content item, wherein the list comprises a subset of the followers of the first user in the social network with the highest viral scores;
    present to the first user, in response to the indication, the list of potential recipients for the content item in descending order of viral scores;
    receive, from the first user, a selection of one or more of the potential recipients; and
    share the content item with the selected one or more potential recipients.

7. The apparatus of claim 6 wherein the viral score is further based on how frequently the second user redistributes content shared with the second user by any other user of the social network.

8. The apparatus of claim 6 wherein the viral score is further based on a probability that content that is publicly shared with the second user appears in the second user's stream.

9. The apparatus of claim 6 wherein the viral score is further based on the number of followers of the second user in the social network.

10. The apparatus of claim 6 wherein the viral score is further based on a viral score for a follower of the second user in the social network.

11. A non-transitory computer-readable storage medium, having instructions stored therein, which when executed, cause a processing device to:
   determine a first viral score for a first user of a social network based on a probability that content that is publicly shared with the first user appears in the first user's stream;
   determine a second viral score for a second user of the social network based on a probability that the second user will notice content that appears in the second user's stream;
   determine, in view of the first viral score, whether the first user is to be included in a list of potential recipients for the content item, wherein the list comprises a subset of the followers of the first user in the social network with the highest viral scores;
   determine, in view of the first viral score, whether the second user is to be included in the list of potential recipients for the content item; and
   present to the first user the list of potential recipients for the content item in descending order of viral scores;
   receive, from the first user, a selection of one or more of the potential recipients; and
   share the content item with the selected one or more potential recipients.

12. The non-transitory computer-readable storage medium of claim 11 wherein the first viral score is further based on a viral score for a follower of the first user in the social network.

13. The non-transitory computer-readable storage medium of claim 11 wherein the second viral score is further based on a probability that content that is publicly shared with the second user appears in the second user's stream.

14. The non-transitory computer-readable storage medium of claim 13 wherein the first viral score is further based on a probability that the first user will notice content that appears in the first user's stream.

15. The non-transitory computer-readable storage medium of claim 11 wherein the first viral score is further based on the number of followers of the first user in the social network.

* * * * *